(12) United States Patent
Bayat et al.

(10) Patent No.: US 10,994,894 B2
(45) Date of Patent: May 4, 2021

(54) LIQUID STORAGE TANK PROTECTION SYSTEM AND METHOD

(71) Applicant: Bauer Compressors, Inc., Norfolk, VA (US)

(72) Inventors: Anthony B. Bayat, Virginia Beach, VA (US); Mark E. Dorsch, Chesapeake, VA (US)

(73) Assignee: BAUER COMPRESSORS, INC., Norfolk, VA (US)

( * ) Notice: Subject to any disclaimer, the term of this patent is extended or adjusted under 35 U.S.C. 154(b) by 195 days.

(21) Appl. No.: 16/507,198

(22) Filed: Jul. 10, 2019

(65) Prior Publication Data

US 2020/0165037 A1 May 28, 2020

Related U.S. Application Data

(60) Provisional application No. 62/771,618, filed on Nov. 27, 2018.

(51) Int. Cl.
*B65D 25/38* (2006.01)
*B65D 51/16* (2006.01)
*B65D 81/18* (2006.01)
*F16K 17/19* (2006.01)

(52) U.S. Cl.
CPC ....... *B65D 25/385* (2013.01); *B65D 51/1644* (2013.01); *B65D 81/18* (2013.01); *B65D 2201/00* (2013.01); *F16K 17/19* (2013.01); *Y10T 137/0324* (2015.04); *Y10T 137/3127* (2015.04)

(58) Field of Classification Search
CPC .. B65D 25/385; B65D 51/1644; B65D 81/18; B65D 2201/00; B65D 90/44; B65D 90/34; F16K 17/19; F16K 37/005; Y10T 137/8326; Y10T 137/0352; Y10T 137/0329; Y10T 137/0324; Y10T 137/0379; Y10T 137/3127
See application file for complete search history.

(56) References Cited

U.S. PATENT DOCUMENTS 5,220,799 A * 6/1993 Lievens ............... B01D 5/0081
220/88.3
5,764,716 A * 6/1998 Eckardt .................. B65D 90/44
376/279

(Continued)

*Primary Examiner* — Craig J Price
*Assistant Examiner* — Andrew J Rost
(74) *Attorney, Agent, or Firm* — Peter J. Van Bergen

(57) ABSTRACT

A liquid storage tank has a breathing valve that vents the tank's headspace at a high-pressure value and admits an ambient gas at a low-pressure value. A controller generates a first control signal when the percentage of the catalyst gas is less than a catalyst threshold, a second control signal when the percentage of the catalyst gas exceeds the catalyst threshold, and a third control signal when the pressure in the headspace is equal to a low-pressure threshold between the breathing valve's low-pressure value and high-pressure value. The first valve is only opened to output inert gas at a discharge pressure greater than the breathing valve's high-pressure value in response to the second control signal. The second valve is only opened to output inert gas at a discharge pressure that is between the breathing valve's low-pressure value and high-pressure value in response to the third control signal.

19 Claims, 4 Drawing Sheets

(56) References Cited

U.S. PATENT DOCUMENTS

| | | | | |
|---|---|---|---|---|
| 6,634,598 B2* | 10/2003 | Susko | .................... | B64D 37/32 |
| | | | | 137/209 |
| 6,904,930 B2* | 6/2005 | Susko | ................... | B64D 37/32 |
| | | | | 137/209 |
| 7,878,214 B1* | 2/2011 | Jansen | ................... | B64G 1/402 |
| | | | | 137/12 |
| 7,921,869 B2* | 4/2011 | Surawski | ........... | A62C 99/0018 |
| | | | | 137/209 |
| 10,611,562 B2* | 4/2020 | Inada | .................... | B65D 90/34 |
| 2010/0263738 A1* | 10/2010 | Taylor | .................. | F16K 17/196 |
| | | | | 137/209 |
| 2012/0037243 A1* | 2/2012 | Taylor | .................... | F16K 27/02 |
| | | | | 137/209 |
| 2018/0335180 A1* | 11/2018 | Markham | ............... | F17C 13/04 |

\* cited by examiner

LIQUID STORAGE TANK PROTECTION SYSTEM AND METHOD

Pursuant to 35 U.S.C. § 119, the benefit of priority from provisional application 62/771,618, with a filing date of Nov. 27, 2018, is claimed for this non-provisional application.

FIELD OF THE INVENTION

The invention relates generally to liquid storage tanks, and more particularly to a system and method that prevents the formation of a combustible gas mixture within and immediately outside of a liquid storage tank where the combustible gas mixture includes oxygen as a catalyst.

BACKGROUND OF THE INVENTION

The headspace in liquid storage tanks often contains volatile gases that become part of a highly-combustible mixture when the volatile gases are allowed to mix with oxygen present within or just outside of such storage tanks. In general, such combustible mixtures are created when a volatile gas has a percentage presence in an oxygen-containing environment (e.g., ambient air) between a well-known Lower Explosive Limit (LEL) and Upper Explosive Limit (UEL). Depending on the configuration of a liquid storage tank's venting system, the highly-combustible mixture can be present within a tank and/or just outside thereof. In both cases, an explosion hazard exists that poses a serious threat to personnel, equipment, and the environment.

By way of example, the above-described problem will be explained for the case of liquid storage tanks used at a crude oil well. As is well-known in the art, liquid storage tanks are used to temporarily hold highly-contaminated produced water that is separated from a mixture of crude oil and water pumped out of the ground. The produced water is a highly toxic mixture that includes methane that readily escapes into a tank's headspace. When the percentage of methane in an oxygen-containing ambient air environment ranges between approximately 5% (i.e., the LEL) and approximately 15% (i.e., UEL), there is a risk of explosion. The scenarios leading to out-of-tank or in-tank explosive risks will be explained with reference to FIGS. 1-3.

In FIG. 1, a conventional produced-water storage tank 100 is illustrated where it is partially filled with produced water 200. As is known in the art, produced water 200 contains methane 202 that can escape from produced water 200 into the tank's headspace 102 as indicated by wavy arrows 204. Tank 100 receives produced water 200 through a tank inlet 104 and discharges produced water 200 through a tank outlet 106. Tank 100 is also equipped with a two-way breathing valve 108 that operates as follows:

- valve 108 opens to vent headspace 102 to oxygen-containing ambient air 300 when a pressure in headspace 102 exceeds a high-pressure threshold $P_1$,
- valve 108 opens to permit ambient air 300 to vent into headspace 102 when a pressure in headspace 102 is less than a low-pressure threshold $P_2$, and
- valve 108 remains closed when a pressure is headspace 102 is between the two threshold pressures.

The two pressure thresholds $P_1$ and $P_2$ are selected to maintain the tank's structural integrity by preventing the occurrence of respective over and under pressure damage. In FIG. 2, the high-pressure scenario is illustrated as the level of produced water 200 in tank 100 rises to increase the pressure in headspace 102 to $P_1$, whereby valve 108 opens to vent headspace 102 (containing methane 202) to ambient air 300 where methane 202 mixes therewith. In FIG. 3, the low-pressure scenario is illustrated as the level of produced water 200 in tank 100 drops to lower the pressure in headspace 102. If/when the pressure in headspace 102 drops to $P_2$, valve 108 opens to admit ambient air 300 into headspace 102 where it mixes with methane 202. An explosion hazard condition can be created just outside of tank 100 (FIG. 2) or inside of tank 100 (FIG. 3) if methane 202 is present in oxygen-containing ambient air 300 in a percentage between the above-described LEL and UEL.

SUMMARY OF THE INVENTION

Accordingly, it is an object of the present invention to provide a system and method that prevents the formation of a combustible gas mixture within or immediately outside of a liquid storage tank.

Another object of the present invention is to provide a system and method for protecting the structural integrity of a produced-water storage tank while simultaneously preventing the formation of a combustible gas mixture within or immediately outside of a produced-water storage tank.

Other objects and advantages of the present invention will become more obvious hereinafter in the specification and drawings.

In accordance with the present invention, a liquid storage tank protection system is provided for use with a liquid storage tank equipped with a two-way breathing valve set to vent the tank's headspace to an ambient gas environment at a high-pressure value and to admit the ambient gas environment into the tank's headspace at a low-pressure value. A first sensor senses a percentage of a catalyst gas in the headspace. A second sensor senses pressure in the headspace. A controller coupled to the first and second sensors generates a first control signal when the percentage of the catalyst gas is less than a catalyst threshold, generates a second control signal when the percentage of the catalyst gas exceeds the catalyst threshold, and generates a third control signal when the pressure in the headspace is equal to a low-pressure threshold between the breathing valve's low-pressure value and high-pressure value. A supply of an inert gas is provided to two valves, each of which is coupled to provide their output to the tank's headspace when the valve is opened. When opened, the first valve outputs the inert gas at a discharge pressure greater than the breathing valve's high-pressure value for introduction into the tank's headspace. The first valve is coupled to the controller wherein the first valve is closed in response to the first control signal and the third control signal, and wherein the first valve is only opened in response to the second control signal. When opened, the second valve outputs the inert gas at a discharge pressure that is between the breathing valve's low-pressure value and high-pressure value for introduction in to the tank's headspace. The second valve is coupled to the controller wherein the second valve is closed in response to the first control signal and the second control signal, and wherein the second valve is only opened in response to the third control signal.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

The present invention is a tank protection system and method for use with liquid storage tanks containing volatile gases that can become part of a highly-combustible mixture when the volatile gases are allowed to mix with oxygen levels found in air. That is, the present invention is suitable for use with any application where a gas of concern can serve as a fuel in the presence of an oxygen catalyst where the percentage of oxygen in an ambient air environment is sufficient to form a highly-combustible mixture with some percentage of the gas fuel.

Figure 1:
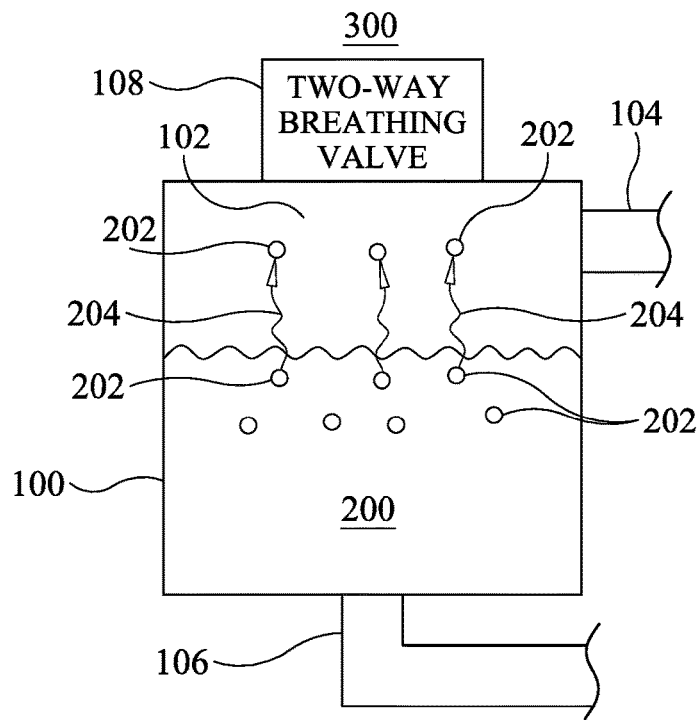
FIG. 1 is a schematic view of a conventional liquid storage tank used to temporarily store produced water.
Figure 2:
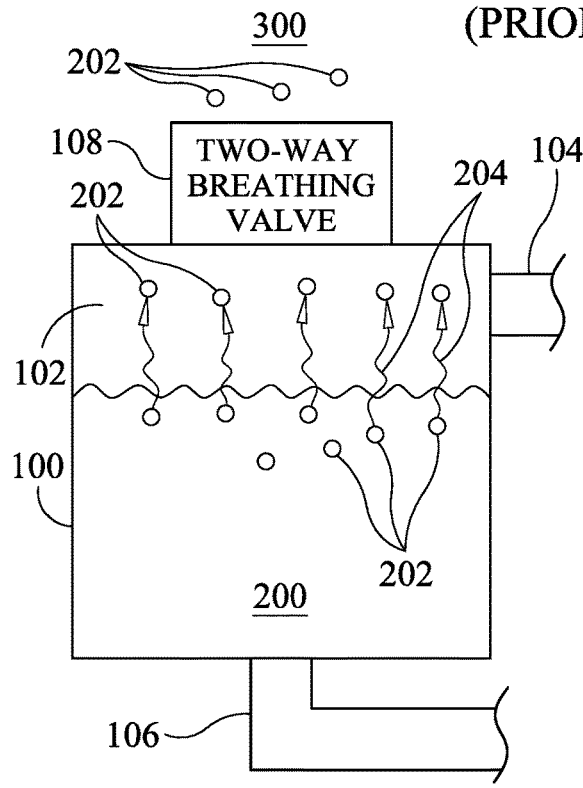
FIG. 2 is a schematic view of the conventional liquid storage tank whose headspace is venting to ambient air in response to a high-pressure condition.
Figure 3:
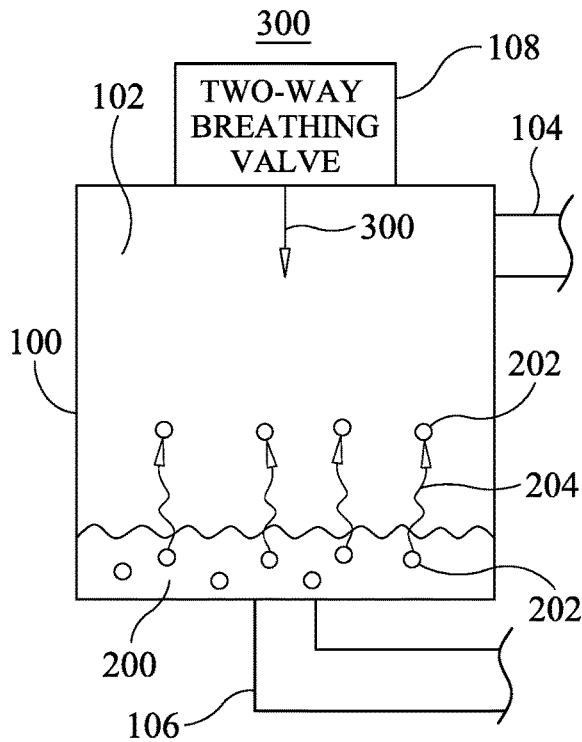
FIG. 3 is a schematic view of the conventional liquid storage tank whose headspace is receiving ambient air in response to a low-pressure condition.
Figure 4:
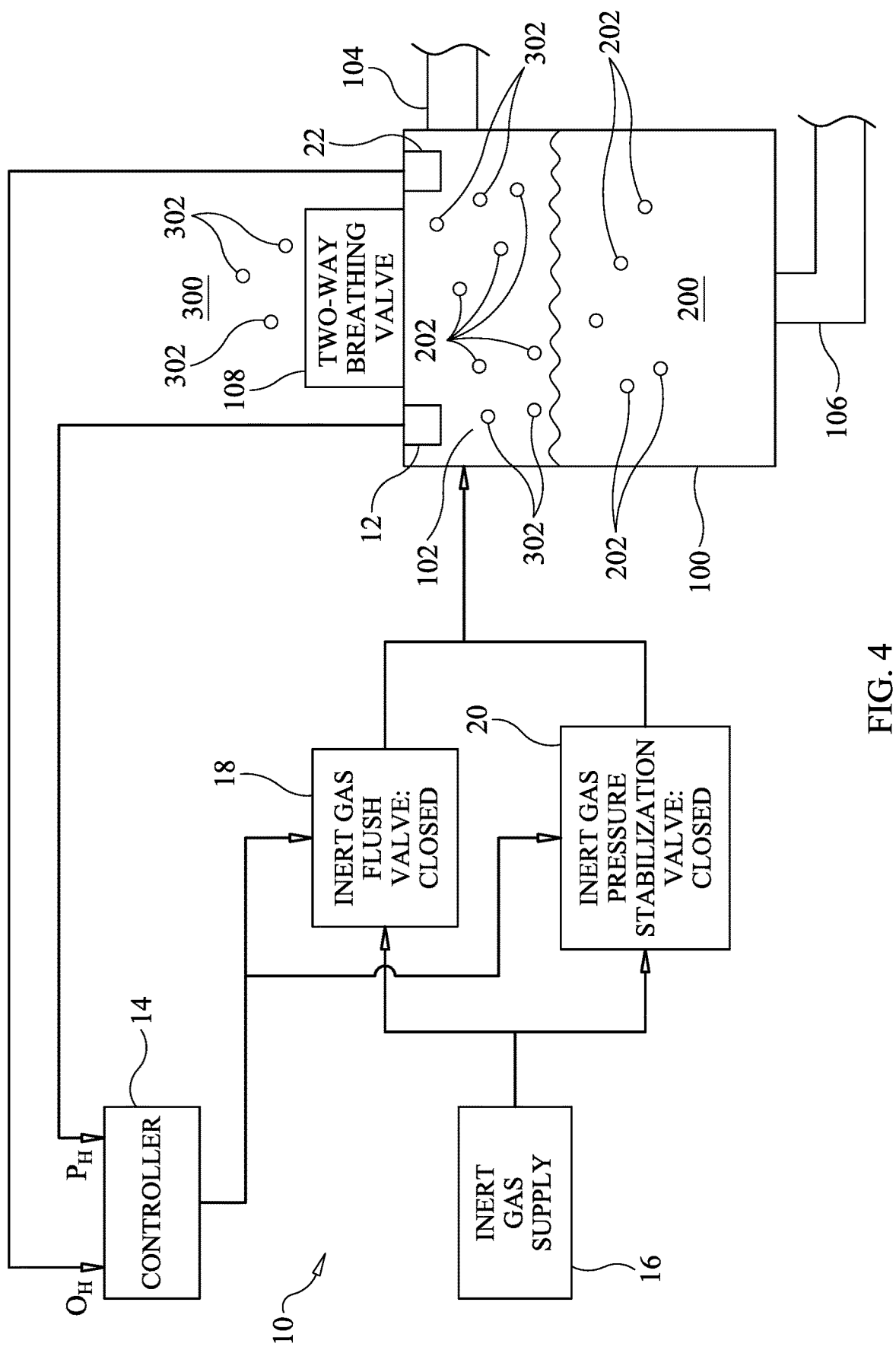
FIG. 4 is a schematic view of a conventional liquid storage tank and a tank protection system in accordance with an embodiment of the present invention.
Figure 5:
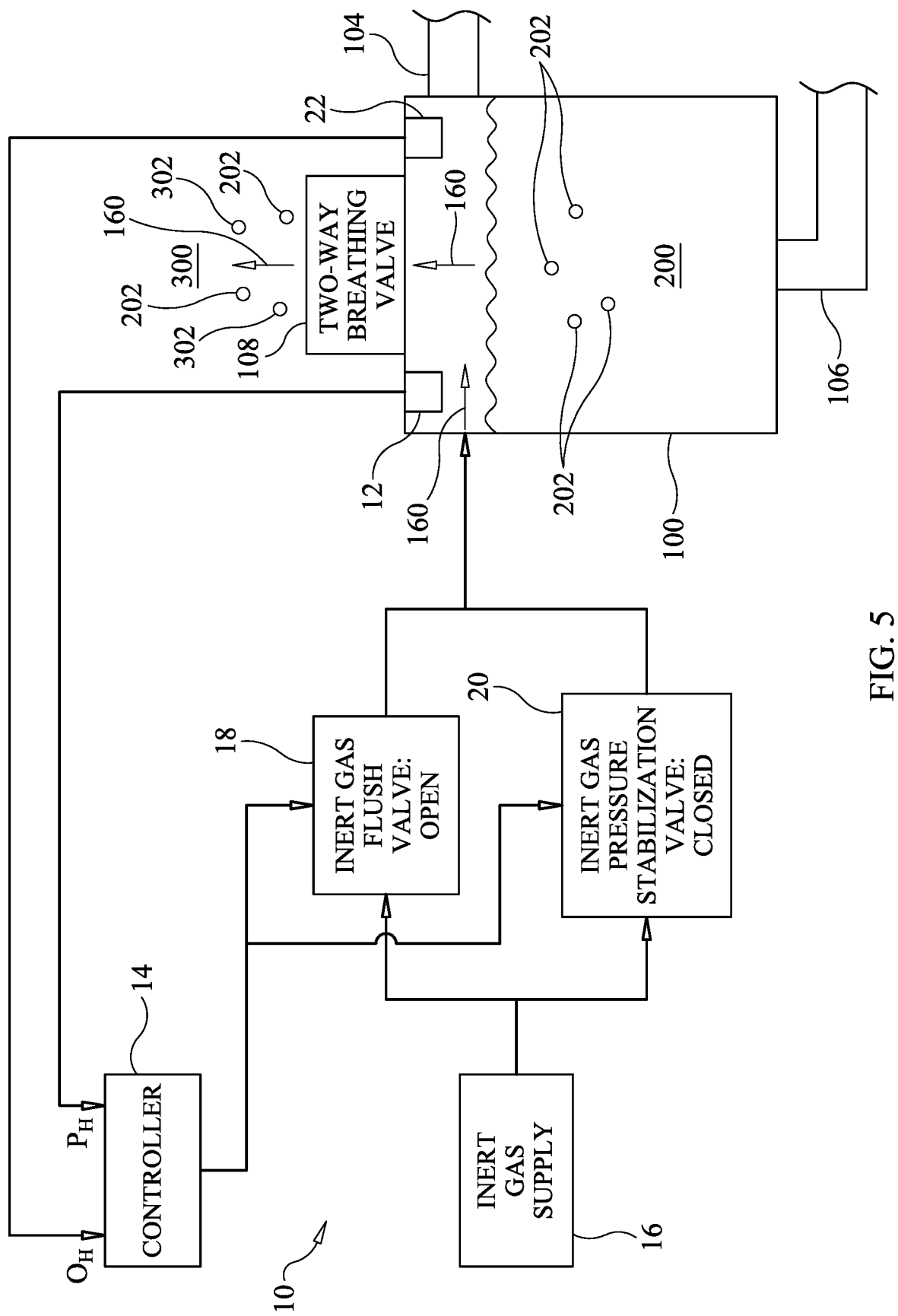
FIG. 5 is a schematic view of the conventional liquid storage tank and the tank protection system operating in response to a dangerous oxygen level condition.
Figure 6:
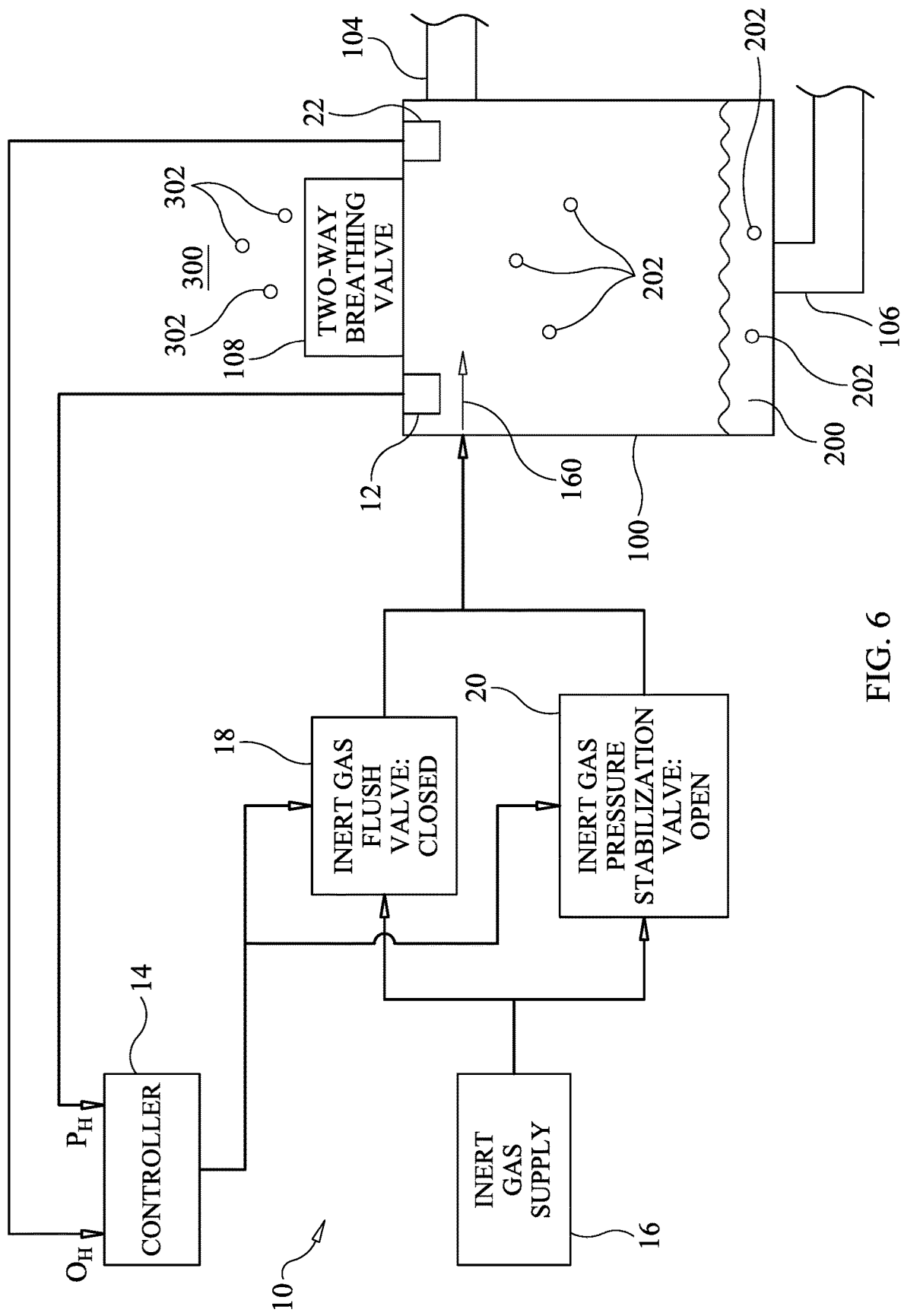
FIG. 6 is a schematic view of the conventional liquid storage tank and the tank-protection system operating in response to a low-pressure condition.

Referring again to the drawings and with simultaneous reference to FIGS. 4-6, a tank protection system in accordance with an embodiment of the present invention is illustrated schematically and is referenced generally by numeral 10. By way of an illustrative example, tank protection system 10 will be described for use with the above-described liquid storage tank 100. In general, tank protection system 10 controls a supply of a pressurized inert gas to the tank's headspace 102 to continuously prevent the formation an explosive mixture of methane 202 and an oxygen-containing air environment regardless of whether the methane-air mixture occurs in headspace 102 or just outside of tank 100. Simultaneously, tank protection system 10 continuously prevents the formation of dangerous low-pressure conditions within tank 100. Briefly, FIG. 4 illustrates system 10 in static state when no inert gas is provided to headspace 102. FIG. 5 illustrates system 10 as it would be configured in response to a dangerous oxygen level condition in headspace 102. FIG. 6 illustrates system 10 as it would be configured in response to a low-pressure condition in headspace 102.

Tank protection system 10 includes a pressure sensor 12 mounted in tank 100, a controller 14, an inert gas supply 16, an inert gas flush valve 18, an inert gas pressure stabilization valve 20, and an oxygen sensor 22 mounted in tank 100. Pressure sensor 12 is representative of one or more pressure sensors that provide controller 14 with the pressure ("$P_H$") in headspace 102. Oxygen sensor 22 is representative of one or more oxygen sensors that provide controller 14 with the percentage ("$O_H$") of oxygen 302 in headspace 102. The type, number, and/or configuration of sensors 12 and 22 are not limitations of the present invention. Controller 14 is any programmable device (e.g., computer, programmable logic device or PLC, etc.) that is programmed with valve-controlling logic governing the discharge pressure of the valves as will be described further below. Inert gas supply 16 is indicative of a pressurized supply of an inert gas to flush valve 18 and to pressure stabilization valve 20 where the supplied pressure is greater than the opening/venting pressure of two-way breathing valve 108. Inert gas supply 16 can originate from a pre-filled container (e.g., cylinder, tank, etc.) of the inert gas or an insert gas generator without departing from the scope of the present invention.

Briefly, tank protection system 10 controls the opening/closing of valves 18 and 20 at any given time such that no inert gas is provided to headspace 102, or such that inert gas at specified unique discharge pressures is provided to headspace 102 through only one of valves 18 and 20. The inert gas provided by supply 16 can be any that will not form a combustible mixture with any gas of concern in headspace 102. In the illustrated example where the gas of concern is methane 202, the inert gas can be nitrogen owing to its ready availability and the cost-effectiveness associated therewith. However, it is to be understood that other inert gases could be used without departing from the scope of the present invention.

Tank protection system 10 includes the previously-described two-way breathing valve 108 that vents to an ambient air environment 300 at a defined headspace-venting high-pressure value $P_1$ and admits ambient air environment 300 into headspace 102 at an ambient-air-admitting low-pressure value $P_2$. The programming logic of controller 14 is provided with the two pressure values as well as an oxygen threshold $O_T$ that is a percentage of oxygen 302 in an ambient air environment (inside or outside of tank 100) associated with a dangerous/explosive condition if the ambient air environment was mixed with methane in an amount between the methane's LEL and UEL. The two pressure values associated with valve 108 are selected to prevent dangerous high and low pressure conditions from occurring within tank 100. As will be explained further below, the present invention simultaneously and continuously prevents all of these conditions.

When methane is the gas/fuel being released into headspace 102, the critical oxygen threshold is approximately 4%. That is, if the percentage of oxygen 302 in headspace 102 is maintained below 4% (or some acceptable plus or minus safety tolerance thereof), then an explosive condition can be prevented in headspace 102 or just outside of tank 100 even if the percentage of methane in headspace 102 or just outside of tank 100 was between methane's LEL and UEL. When the pressure $P_H$ in headspace 102 falls between values $P_1$ and $P_2$ (or some acceptable plus or minus safety tolerance thereof, e.g., $(0.9)P_1 > P_H > (1.1)P_2$) and when the oxygen level $O_H$ in headspace 102 is less than the above-noted critical oxygen threshold $O_T$ (or some acceptable plus or minus safety tolerance thereof, e.g., $O_H < (0.8)O_T$), valves 18 and 20 are closed as controlled via control signals generated by and output from controller 14 as shown in FIG. 4 such that no inert gas is supplied to headspace 102. In this way, wasteful use and depletion of inert gas supply 16 is prevented.

When the headspace oxygen percentage $O_H$ exceeds the acceptable safety tolerance of the oxygen threshold $O_T$ (e.g., $O_H > (0.8)O_T$), pressure stabilization valve 20 is kept closed and only gas flush valve 18 is opened as governed by control signals output from controller 14 as shown in FIG. 5. In this dangerous oxygen condition, supply 16 and flush valve 18 cooperate to introduce a flow of inert gas 160 into headspace 102 at a valve discharge pressure that exceeds high-pressure value $P_1$ such that headspace pressure $P_H$ quickly increases thereby placing two-way breathing valve 108 in its open/venting state. When this occurs, the flow of inert gas 160 essentially flushes headspace 102 along with the methane 202 and oxygen 302 in headspace 102. Since methane 202 and oxygen 302 in headspace 102 are replaced with inert gas 160, the formation of an explosive mixture of oxygen and methane in tank 100 is prevented. Furthermore, since the replaced mixture of methane 202 and oxygen 302 in headspace 102 enters ambient air 300 immediately outside of tank 100 along with the flow of inert gas 160, the percentage of oxygen immediately outside of tank 100 is reduced below that normally found in ambient air 300 to thereby also eliminate the possibility of the formation of an explosive mixture of oxygen and methane just outside of tank 100 even if the methane percentage is between methane's LEL and UEL. Flush valve 18 is closed and the flow of inert gas 160 into headspace 102 (at the valve discharge pressure greater than value $P_1$) is ceased when the oxygen percentage $O_H$ in headspace 102 is less than the oxygen threshold $O_T$ (or less than the acceptable safety tolerance thereof, e.g., $O_H<(0.8)O_T$) to once again prevent wasteful use and depletion of inert gas supply 16.

As produced water 200 is drained from tank 100, headspace pressure $P_H$ can fall to a dangerous low pressure at which the structural integrity of tank 100 can be compromised. To prevent this condition, controller 14 monitors headspace pressure $P_H$. When headspace pressure $P_H$ falls to a level that is equal to a low-pressure safety tolerance value less than the high-pressure value $P_1$ but greater than the low-pressure value $P_2$ (e.g., $P_1>(1.1)P_2=P_H>P_2$), flush valve 18 is kept closed and only gas pressure stabilization valve 20 is opened as governed by control signals output from controller 14 as shown in FIG. 6. In this low-pressure condition, supply 16 and pressure stabilization valve 20 cooperate to introduce a flow-of inert gas 160 into headspace 102 at a second pressure less than high-pressure value $P_1$ but greater than low-pressure threshold $P_2$ (or its low-pressure safety tolerance such as $(1.1)P_2$). As a result, the headspace pressure $P_H$ is increased to exceed the acceptable low-pressure safety tolerance, while remaining less than the high-pressure value $P_1$ thereby preventing two-way breathing valve 108 from opening to admit ambient air 300 into headspace 102. When this occurs, ambient air 300 with its inherent oxygen percentage is prevented from entering headspace 102, while inert gas 160 simultaneously mixes with methane 202 in headspace 102. Since ambient air 300 is kept out of headspace 102 and since methane 202 is mixed with inert gas 160, the formation of an explosive methane-oxygen mixture within tank 100 is continuously prevented during a low-pressure condition. Even if two-way breathing valve 108 were to inadvertently or erroneously open to admit ambient air 300, the low-pressure introduction of inert gas 160 combined with the oxygen monitoring/flushing operation described above prevents the formation of an explosive methane-oxygen mixture. Pressure stabilization valve 20 is closed by controller 14 at some interim pressure less than the high-pressure value (e.g., $(0.5)P_1$) at which point tank protection system 10 is returned to its static state illustrated in FIG. 4 whereby inert gas supply is again conserved.

The advantages of the present invention are numerous. The tank protection system continuously assures that a combustible gas mixture can never be formed within or just outside of a liquid storage tank. Safe oxygen levels are maintained within the tank at all times without wasting the inert gas since the inert gas is never used as a continual flush of the tank's headspace. Still further, the system simultaneously and continuously protects the structural integrity of the tank by preventing over or under pressurization conditions.

Although the invention has been described relative to specific embodiments thereof, there are numerous variations and modifications that will be readily apparent to those skilled in the art in light of the above teachings. For example, the tank protection system could also be equipped to sense and monitor the presence and percentage of the gas fuel of concern (e.g., methane) as a form of safety redundancy. It is therefore to be understood that, within the scope of the appended claims, the invention may be practiced other than as specifically described.

What is claimed as new and desired to be secured by Letters Patent of the United States is:

1. A method for protecting a liquid storage tank, comprising the steps of:
    providing a liquid storage tank equipped with a two-way breathing valve set to vent a headspace of the liquid storage tank to an ambient gas environment at a high-pressure value and to admit the ambient gas environment into the headspace at a low-pressure value;
    sensing a percentage of a catalyst gas in the headspace;
    sensing pressure in the headspace;
    introducing an inert gas into the headspace at a first pressure greater than said high-pressure value only when said percentage of the catalyst gas exceeds a catalyst threshold wherein the two-way breathing valve opens to vent a gas mixture from the headspace into the ambient gas environment until said percentage of the catalyst gas is less than said catalyst threshold, wherein said gas mixture includes the catalyst gas and said inert gas; and
    introducing said inert gas into the headspace at a second pressure between said low-pressure value and said high-pressure value only when said pressure in the headspace is equal to a low-pressure threshold between said low-pressure value and said high-pressure value and only until said pressure in the headspace is increased to an interim pressure between said low-pressure threshold and said high-pressure value.

2. A method according to claim 1, wherein the catalyst gas comprises oxygen.

3. A method according to claim 1, wherein said inert gas comprises nitrogen.

4. A method according to claim 1, wherein the catalyst gas comprises oxygen and said insert gas comprises nitrogen.

5. A method according to claim 1, wherein the catalyst gas comprises oxygen, and wherein said catalyst threshold is less than 4%.

6. A method according to claim 1, further comprising the step of generating said insert gas for use in said steps of introducing.

7. A liquid storage tank protection system, comprising:
    a first sensor adapted to sense a percentage of a catalyst gas in a headspace of a liquid storage tank equipped with a two-way breathing valve set to vent the headspace to an ambient gas environment at a high-pressure value and to admit the ambient gas environment into the headspace at a low-pressure value;
    a second sensor adapted to sense pressure in the headspace;
    a controller coupled to said first sensor and said second sensor for generating a first control signal when said percentage of the catalyst gas is less than a catalyst threshold, a second control signal when said percentage of the catalyst gas exceeds said catalyst threshold, and a third control signal when said pressure in the headspace is equal to a low-pressure threshold between said low-pressure value and said high-pressure value;

a supply of an inert gas at a supply pressure greater than said high-pressure value;

a first valve coupled to said supply and adapted to be coupled to the headspace, said first valve coupled to said controller wherein said first valve is closed in response to said first control signal and said third control signal, and wherein said first valve is only opened in response to said second control signal wherein a discharge pressure of said first valve is greater than said high-pressure value; and a second valve coupled to said supply and adapted to be coupled to the headspace, said second valve coupled to said controller wherein said second valve is closed in response to said first control signal and said second control signal, and wherein said second valve is only opened in response to said third control signal wherein a discharge pressure of said second valve is less than said high-pressure value.

8. A liquid storage tank protection system as in claim 7, wherein the catalyst gas is oxygen, and wherein said inert gas comprises nitrogen.

9. A liquid storage tank protection system as in claim 7, wherein the catalyst gas is oxygen, and wherein said catalyst threshold is less than 4%.

10. A liquid storage tank protection system as in claim 7, wherein the catalyst gas is oxygen, wherein said catalyst threshold is less than 4%, and wherein said inert gas comprises nitrogen.

11. A liquid storage tank protection system as in claim 7, wherein said supply is selected from the group consisting of a container of said inert gas and a generator of said inert gas.

12. A liquid storage tank protection system, comprising:
a first sensor adapted to be disposed in a headspace of a liquid storage tank equipped with a two-way breathing valve set to vent the headspace to an ambient gas environment at a high-pressure value and to admit the ambient gas environment into the headspace at a low-pressure value, said first sensor sensing a percentage of a catalyst gas in the headspace;

a second sensor adapted to be disposed in the headspace for sensing pressure in the headspace;

a controller coupled to said first sensor and said second sensor for generating a first control signal when said percentage of the catalyst gas is less than a catalyst threshold, a second control signal when said percentage of the catalyst gas exceeds said catalyst threshold, and a third control signal when said pressure in the headspace is equal to a low-pressure threshold between said low-pressure value and said high-pressure value;

a supply of an inert gas;

a first valve coupled to said supply wherein, when opened, said first valve outputs said inert gas at a discharge pressure that is greater than said high-pressure value, said first valve adapted to be coupled to the headspace wherein said inert gas output from said first valve is introduced into the headspace, said first valve coupled to said controller wherein said first valve is closed in response to said first control signal and said third control signal, and wherein said first valve is only opened in response to said second control signal; and a second valve coupled to said supply wherein, when opened, said second valve outputs said inert gas at a discharge pressure that is between said low-pressure value and said high-pressure value, said second valve adapted to be coupled to the headspace wherein said inert gas output from said second valve is introduced into the headspace, said second valve coupled to said controller wherein said second valve is closed in response to said first control signal and said second control signal, and wherein said second valve is only opened in response to said third control signal.

13. A liquid storage tank protection system as in claim 12, wherein the catalyst gas is oxygen, and wherein said inert gas comprises nitrogen.

14. A liquid storage tank protection system as in claim 12, wherein the catalyst gas is oxygen, and wherein said catalyst threshold is less than 4%.

15. A liquid storage tank protection system as in claim 12, wherein the catalyst gas is oxygen, wherein said catalyst threshold is less than 4%, and wherein said inert gas comprises nitrogen.

16. A liquid storage tank protection system as in claim 12, wherein said supply is selected from the group consisting of a container of said inert gas and a generator of said inert gas.

17. A protection system for a produced-water storage tank protection, said protection system comprising:
a first sensor adapted to sense a percentage of oxygen in a headspace of a produced-water storage tank equipped with a two-way breathing valve set to vent the headspace to an ambient air environment at a high-pressure value and to admit the ambient air environment into the headspace at a low-pressure value;

a second sensor adapted to sense pressure in the headspace;

a controller coupled to said first sensor and said second sensor for generating a first control signal when said percentage of oxygen is less than a threshold percentage at which oxygen can serve as a combustion catalyst in the presence of methane, a second control signal when said percentage of oxygen exceeds said threshold percentage, and a third control signal when said pressure in the headspace is equal to a low-pressure threshold between said low-pressure value and said high-pressure value;

a supply of nitrogen gas;

a first valve coupled to said supply wherein, when opened, said first valve outputs said nitrogen gas at a discharge pressure that is greater than said high-pressure value, said first valve adapted to be coupled to the headspace wherein said nitrogen gas output from said first valve is introduced into the headspace, said first valve coupled to said controller wherein said first valve is closed in response to said first control signal and said third control signal, and wherein said first valve is opened only in response to said second control signal; and a second valve coupled to said supply wherein, when opened, said second valve outputs said nitrogen gas at a discharge pressure that is between said low-pressure value and said high-pressure value, said second valve adapted to be coupled to the headspace wherein said nitrogen gas output from said second valve is introduced into the headspace, said second valve coupled to said controller wherein said second valve is closed in response to said first control signal and said second control signal, and wherein said second valve is opened only in response to said third control signal.

18. A protection system as in claim 17, wherein said threshold percentage is less than 4%.

19. A protection system as in claim 17, wherein said supply is selected from the group consisting of a container of said inert gas and a generator of said inert gas.

* * * * *